United States Patent
Kaibel

[11] Patent Number: 5,960,060
[45] Date of Patent: Sep. 28, 1999

[54] LINE TESTER FOR COIN-OPERATED TELEPHONES

[75] Inventor: Gary W. Kaibel, Troy, Mo.

[73] Assignee: J. V. Technologies, Inc., Troy, Mo.

[21] Appl. No.: 08/914,378

[22] Filed: Aug. 19, 1997

[51] Int. Cl.⁶ .......................... H04M 1/24; H04M 17/00
[52] U.S. Cl. ................... 379/21; 379/146; 379/29
[58] Field of Search .................. 379/21, 19, 27, 379/30, 31, 143, 146, 147, 145, 22, 26, 148, 149, 150, 151, 23, 24, 29, 1, 12

[56] References Cited

U.S. PATENT DOCUMENTS

| | | |
|---|---|---|
| Re. 31,782 | 12/1984 | Simmonds . |
| 2,680,161 | 6/1954 | Clement . |
| 2,799,739 | 7/1957 | Lowman et al. . |
| 2,956,229 | 10/1960 | Henel . |
| 3,410,966 | 11/1968 | Davies . |
| 3,496,300 | 2/1970 | Stokes . |
| 3,508,139 | 4/1970 | Rummel . |
| 3,600,274 | 8/1971 | Trickett et al. . |
| 3,600,678 | 8/1971 | Garrett . |
| 3,691,320 | 9/1972 | Grandle, Jr. . |
| 3,694,587 | 9/1972 | Grandle, Jr. . |
| 3,699,274 | 10/1972 | Bennett . |
| 3,711,661 | 1/1973 | Garrett et al. . |
| 3,729,597 | 4/1973 | Garrett et al. . |
| 3,739,107 | 6/1973 | Spencer . |
| 3,806,803 | 4/1974 | Hall . |
| 3,814,869 | 6/1974 | De Luca . |
| 3,922,507 | 11/1975 | White . |
| 3,941,950 | 3/1976 | Dunwoodie et al. . |
| 3,976,849 | 8/1976 | Champan . |
| 4,022,987 | 5/1977 | O'Dea . |
| 4,051,333 | 9/1977 | Schomburg . |
| 4,054,759 | 10/1977 | McGrath et al. . |
| 4,055,733 | 10/1977 | Holsinger et al. . |
| 4,079,210 | 3/1978 | Sanderson . |
| 4,186,283 | 1/1980 | Simmonds . |
| 4,204,094 | 5/1980 | Cepelinski . |
| 4,209,671 | 6/1980 | Charles et al. . |
| 4,369,341 | 1/1983 | Ahuja . |
| 4,415,778 | 11/1983 | Turner . |
| 4,438,299 | 3/1984 | Tomim . |
| 4,447,679 | 5/1984 | Kojima et al. . |
| 4,513,176 | 4/1985 | Fostveit . |
| 4,513,179 | 4/1985 | Phillips et al. . |
| 4,536,703 | 8/1985 | Jablway et al. . |
| 4,544,807 | 10/1985 | Sers . |
| 4,552,996 | 11/1985 | de Bergh . |
| 4,564,728 | 1/1986 | Romano . |
| 4,582,965 | 4/1986 | Lembke . |
| 4,600,810 | 7/1986 | Feldman et al. . |
| 4,679,224 | 7/1987 | Lynch et al. . |
| 4,720,845 | 1/1988 | Lechner et al. . |
| 4,751,724 | 6/1988 | Amadio et al. . |
| 4,777,644 | 10/1988 | Butterworth et al. . |
| 4,777,645 | 10/1988 | Faith et al. . |
| 4,825,458 | 4/1989 | Dash . |
| 4,827,498 | 5/1989 | Ross . |
| 4,841,559 | 6/1989 | Curtis . |
| 4,860,332 | 8/1989 | Chism . |
| 4,912,755 | 3/1990 | Blood et al. . |
| 4,945,555 | 7/1990 | Teumer et al. . |
| 4,969,179 | 11/1990 | Kanare et al. . |
| 5,025,466 | 6/1991 | Hilligoss et al. . |
| 5,123,041 | 6/1992 | Brinkmoeller . |
| 5,193,108 | 3/1993 | Stocklin ................. 379/21 |
| 5,218,616 | 6/1993 | Stephens . |
| 5,440,612 | 8/1995 | Siligoni et al. . |
| 5,515,218 | 5/1996 | Dehaven ................. 324/510 |
| 5,754,624 | 5/1998 | Sullivan et al. ........... 379/21 |

*Primary Examiner*—Curtis A. Kuntz
*Assistant Examiner*—Rexford N. Barnie
*Attorney, Agent, or Firm*—Caesar, Rivise, Bernstein, Cohen & Pokotilow, Ltd.

[57] ABSTRACT

A line tester unit for coin-operated telephones that permits the interface between the coin-operated telephones and the telephone network to be efficiently verified at most access points throughout the telephone network.

10 Claims, 5 Drawing Sheets

LINE TESTER FOR COIN-OPERATED TELEPHONES

FIELD OF THE INVENTION

The invention relates generally to electrical test units, more specifically to electrical test units for properly interfacing a coin-operated telephone with a conventional telephone network.

BACKGROUND OF THE INVENTION

One of a plurality of branches of a typical telephone company network operation is shown in FIG. 1. The telephone network comprises a central office (CO) that comprises a public communications (PC) department, a network distributions services (NDS) department, and a subscriber line carrier (SLC) group. In addition, the CO comprises the electronic switching system (ESS), also known as the "programming network" which gives the CO equipment an identity.

The PC department handles the installation, repair and maintenance of coin-operated telephones 38, as well as a portion of the interface terminals 40.

The NDS department handles the installation, repair and maintenance of the telephone lines, as well as the customer/public communications interface. The NDS department also maintains the main distribution and auxiliary field distribution interfaces (FDI).

The SLC group handles the installation, repair and maintenance of the pair-gain system and field electronic interface cards housed in the remote terminal (RT, located above ground) in conjunction with a control equipment vault (CEV, located underground). The pair-gain system consists of fiber optic lines which are routed from the CO to the RT/CEV interfaces. The pair-gain system creates more capacity of subscriber lines than the conventional copper lines.

Prior to Apr. 15, 1997, the installation and repair of coin-operated telephones, that utilize −130 return voltage and +130 collect voltage, relied heavily on communication between PC technicians and NDS technicians. For example, the NDS technicians in the field would communicate with PC technicians to obtain all polarity and interface data. However, new federal regulations enacted on Apr. 15, 1997 prohibit the PC groups from utilizing NDS groups. As a result, NDS technicians in the field must be self-reliant on obtaining the necessary polarity and interface data.

Thus, there remains a need for a device that can be used by NDS technicians to determine all of the necessary polarity and interface data to properly install and/or repair coin-operated telephones while complying with federal regulations that prohibit PC groups from utilizing NDS groups.

OBJECTS OF THE INVENTION

Accordingly, it is the general object of this invention to provide an apparatus which improves upon and overcomes the disadvantages of the prior art.

It is an object of this invention to provide a means for the network distribution services to properly install and/or repair coin-operated telephones while complying with federal regulations that prohibit the public communications group from utilizing network distribution services.

It is another object of this invention to provide a line tester that can permits a coin-operated telephone to be installed properly.

It is another object of this invention to provide a line tester that permits a coin-operated telephone to be installed in a timely fashion.

It is yet another object of this invention to provide a line tester that permits the repair of a coin-operated telephone to be accomplished as quickly and as nominally as possible.

It is still yet another object of this invention to enable a telephone technician to correctly identify the polarity on the telephone line he/she is servicing.

It is yet another object of this invention to correctly identify the electronic switching system translation from the central office equipment.

It is yet another object of this invention to identify that the correct central office coin supervisory line equipment has been issued.

It is yet another object of this invention to identify if the coin-operated telephone is on a pair gain system (subscriber line carrier).

It is even yet another object of this invention to identify if the pair gain system electronic cards are correct and working properly in the central office and remote terminal.

It is even yet another object of this invention to eliminate the need for changing out expensive parts such as the chassis and relay inside the telephone equipment.

It is still yet a further object of this invention to save time and money in identifying that problems with the coin return of the coin-operated telephone is either in the set or in the network distribution services department, or in the subscriber line carrier group.

It is still yet a further object of this invention to eliminate the need for repeat reports and delayed installations by readily identifying problems with the coin-operated telephone.

It is still yet even a further object of this invention to provide the public services department with a competitive edge by the use of such a line tester.

SUMMARY OF THE INVENTION

These and other objects of the instant invention are achieved by providing a portable testing unit for testing the interface between a coin-operated telephone and a telephone network connected thereto, wherein the telephone network carries a TIP electrical signal, a RING electrical signal, and a ground connection associated therewith. The portable testing unit is a passive, electrically operative, e.g., solid-state, device which simulates the input and output of the coin-operated telephone to determine polarity between the telephone and the telephone network.

The portable testing unit includes a first probe for coupling to the telephone network to sense the TIP electrical signal, a second probe for coupling to the telephone network to sense the RING electrical signal, and a third probe for coupling to the ground connection. The unit also includes electronic means, e.g., ground sensing means, coin return voltage means, dial tone capture means, and signal conditioning means, coupled to the probes to provide a first output signal when the detected polarity is proper and a second output signal when the detected polarity is improper. in accordance with one preferred aspect of the invention the device is a passive unit, arranged for drawing electrical power to operate it from the telephone network.

In addition, these same objects are achieved by providing a method for testing the interface between a coin-operated telephone and a telephone network wherein the telephone network carries a TIP electrical signal, a RING electrical signal and has a ground connection (GND) associated therewith at respective terminals at a plurality of access points. The method comprises the steps of (a) coupling the TIP electrical signal terminal to the RING electrical signal terminal through a series combination of a rectifier/current limiter, a pair of oppositely-oriented light-emitting diodes connected in parallel, and an open switch; and (b) closing the switch to electrically couple the TIP electrical signal terminal and the RING electrical signal terminal through the series combination and monitoring which of the pair of oppositely-oriented light emitting diodes illuminates to determine the TIP-RING polarity.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
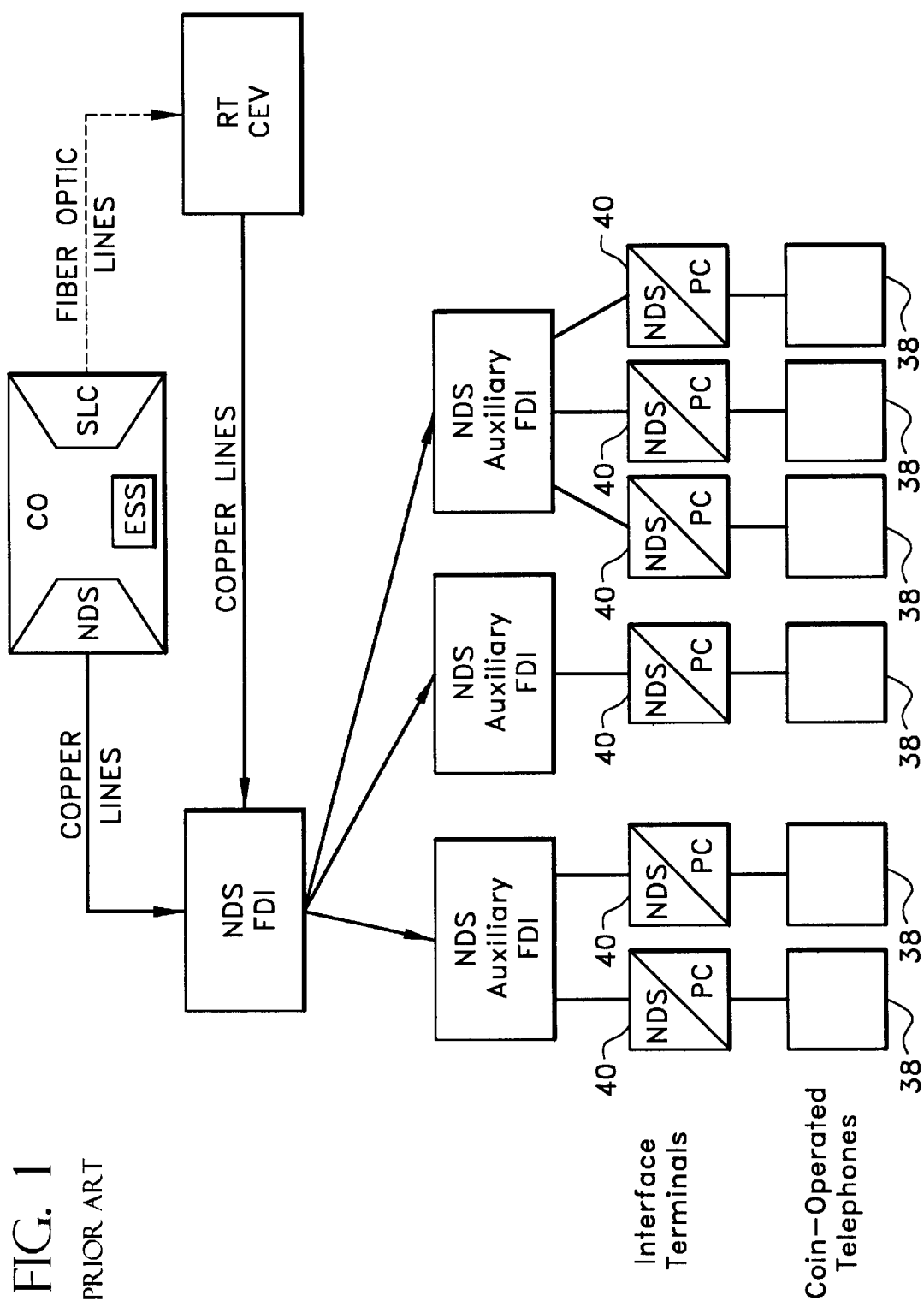
FIG. 1 is a block diagram of a conventional telephone company network operation.
Figure 2:
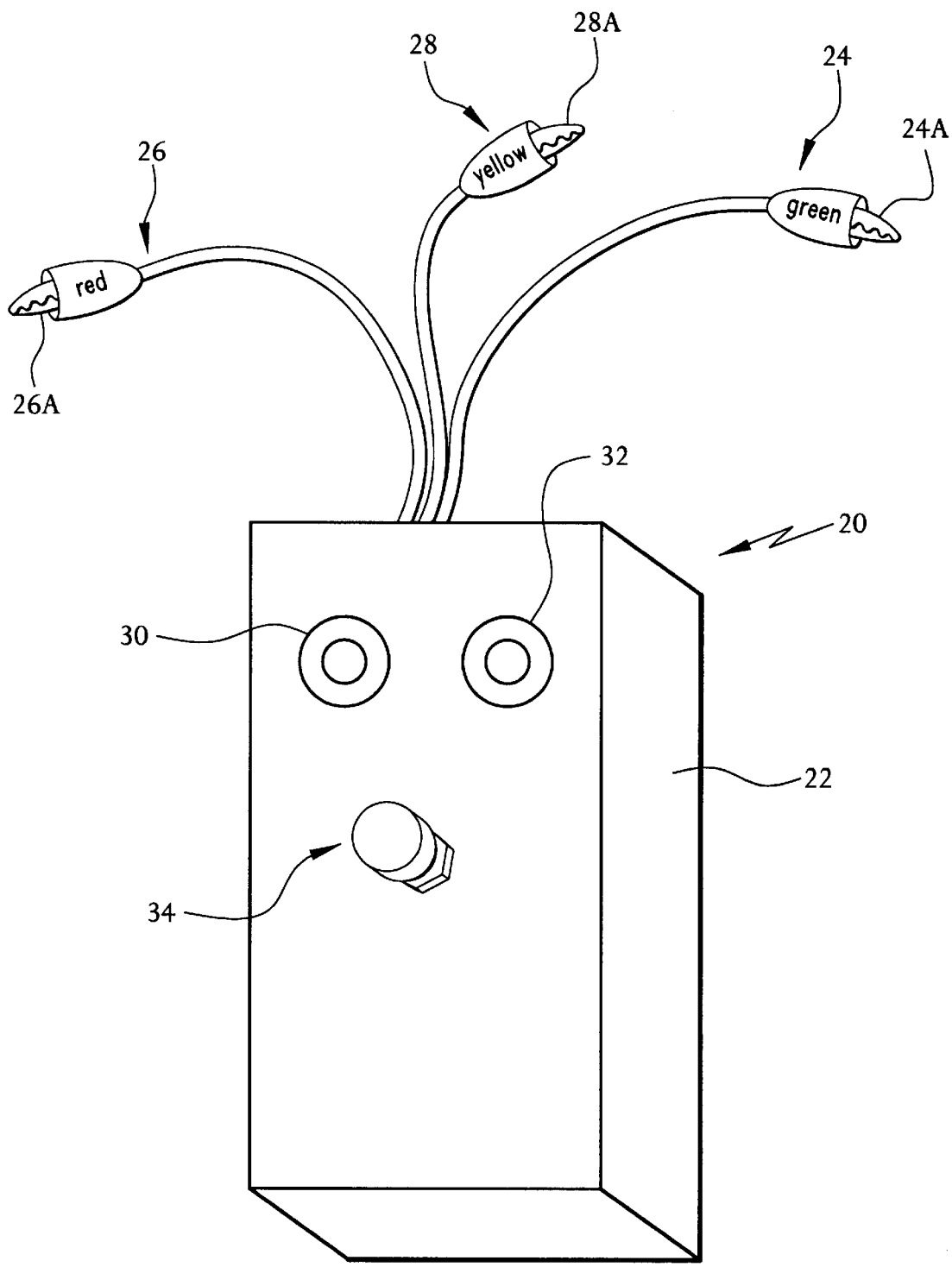
FIG. 2 is an isometric view of the line tester of the present invention.

Referring now in detail to the various figures of the drawing wherein like reference characters refer to like parts, there is shown at 20 in FIG. 2, a portable line tester unit that can be used for testing the interface of a coin-operated telephone and the telephone network.

Figure 3:
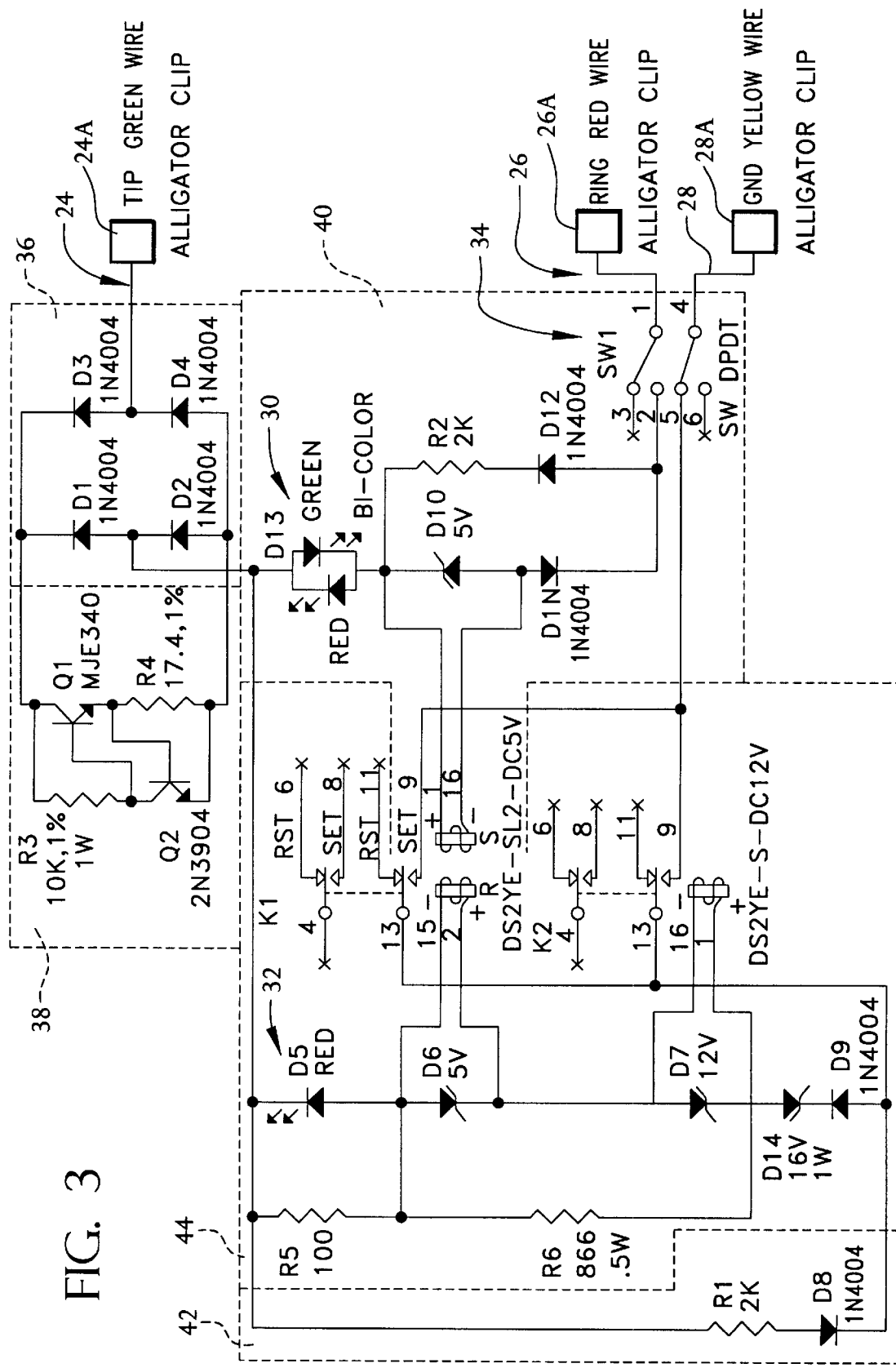
FIG. 3 is an electrical schematic of the line tester.

Basically, the line tester unit 20 comprises a housing 22, a TIP test lead 24, a RING test lead 26, a GND test lead 28, a first indication means 30, a second indication means 32 and a manually-operable switch means 34. Each of the test leads comprises a respective terminal clip (e.g., an alligator clip) 24A, 26A and 28A that permit the technician to electrically couple the test leads 24–28 to a typical telephone network access point having TIP, RING and GND terminals (or other ground connection associated with the network) that ultimately connect up to the coin-operated telephone. The first indication means 30 comprises an illuminator (e.g., a green bi-color L.E.D. D13 as shown in FIG. 3) forming a first output signal and another illuminator (e.g., a red bi-color L.E.D. D13 as shown in FIG. 3) forming a second output signal. As will be discussed in detail later, these two illuminators operate exclusively of each other such that, during testing, lighting of the green illuminator indicates proper polarity whereas lighting of the red illuminator indicates improper polarity. The second indication means 32 comprises another illuminator (e.g., red L.E.D. D5 as shown in FIG. 3) that illuminates for the duration of a −130 return voltage pulse, to be discussed later. The manually-operable switch means 34 (e.g., a momentary double pole, double throw switch, indicated by SW1 in FIG. 3) is activated by the technician during the test to simulate the depositing of a coin in the coin-operated telephone.

The electrical schematic of the line tester unit 20 is shown in FIG. 3. In particular, the electronics comprise bridge rectifier means 36, current limiting means 38, dial tone capture means 40, ground sensing means 42, and coin return voltage means 44.

The bridge rectifier means 36 is electrically coupled to the TIP test lead 24. The purpose of the bridge rectifier means 36 is to steer current flowing from the TIP test lead 24 to the RING test lead 26, or from the GND test lead 28 to the TIP test lead 24, across the current limiting means 38 in the proper polarity direction.

The current limiting means 38 sets the maximum current limit.

The dial tone capture means 40 provides the means for capturing the dial tone, if the polarity is proper, and for supporting the operation of the first indication means 24. The RING test lead 26 and GND test lead 28 are coupled to the dial tone capture means 40 via the manually-operable switch means 34. The manually-operable switch 34 (SW1) is a push-button momentary switch that simulates the switch hook on a telephone. If the polarity from TIP to RING is proper, then current will flow through D13, K1, D11 and SW1, thus illuminating the green illuminator in the first indication means 30 and setting relay K1. If the TIP to RING polarity is incorrect, then current will flow through D13, R2, D12 and SW1, thereby illuminating the red illuminator in the first illumination means 30 and the relay K1 will remain reset. D11 and D12 are current direction diodes. D10 is a maximum voltage across relay coil K1 and coil kick-back suppression.

The ground sensing means 42 provides the pathway for the ground test.

The coin return voltage means 44 provides the latching and switching necessary for supporting the −130 return voltage test. R6 is a shunt to both relays K1 and K2. D14 allows for a 5 second current test.

Operation of the line tester unit 20 is as follows.

The technician connects the test leads 24–26 to a respective TIP electrical signal terminal, RING electrical signal terminal and nearby ground connection, if there is no ground terminal available at the particular access point. The technician then depresses manually-operable switch 34, thereby defining a first switch state. If the TIP-RING polarity is correct, the first indication means 30 illuminates green and a dial tone is captured. Capture of the dial tone sets the relay K1. On the other hand, if the TIP-RING polarity is incorrect, the first illumination means 30 illuminates red, indicating a cross TIP-RING, and no dial tone is received; relay K1 remains reset.

If the TIP-RING polarity was proper, then the technician releases the manually operable switch 34 (thereby defining a second switch state) and the first illumination means 30 turns off and the dial tone terminates. The central office CO then senses for a ground connection, through R1, from TIP to GND. If the ground test is proper, current will flow through R1, D8, K1 and SW1; D9 is a polarity diode and R1 is a current limiting resistor.

If the ground test was proper, the CO then transmits a −130 return voltage, from TIP to GND. If the ground test was improper, i.e., the second illumination means 32 never illuminates, then the CO will not send a −130 return voltage.

If the −130 return voltage is transmitted, current will flow through SW1, the contacts of K1, D9, coil of K2 and coil of K1 and through the second indication means 34, thereby illuminating the L.E.D. D5. When 15 mA of current flows through the coil of K2, its contacts will close. With relay K2 closed, this holds the current through the circuit until the current ceases. In particular, the relay K2 latches the continuity of the circuit and will last for the duration of the −130 return voltage pulse. When the −130 return voltage pulse terminates, the relay K2 will open, thereby also opening the circuit. L.E.D. D5 remains illuminated for the duration of the −130 return voltage pulse.

If D5 does not illuminate, then the technician must decide the courses of action from a trouble shooting guide:

a) coin-operated telephone technician checks for good earth connection; if the ground is good, the fault may lie within the NDS department, or within the SLC group;

b) NDS technician checks to verify ESS translations and/or coin supervisory line equipment. If both of these are correct, the fault may lie within the SLC group if the dial tone is provided through a pair-gain system;

c) SLC technician should verify the correct type of SLC coin cards are in place for the pair-gain system that they are in. The fault may lie within a wrong or defective SLC card. As stated previously, D9 is a polarity diode, D14 is a voltage drop diode and R6 is a shunt with relays K1 and K2. These components assist in testing minimum current in long telephone lines. R5 is a shunt to D5 to suppress the L.E.D. D5 when stray voltages are present on an open telephone line.

The line tester 20 can be used by all departments (except ESS) throughout the network operations, at any access point where a TIP electrical signal, a RING electrical signal and a GND connection are available. The test procedure described above is the same at any of these access points. Technicians from the different departments use all three of the test leads 24, 26 and 28. The ground source terminal connection is not provided by the telephone line but is rather associated with the telephone line surroundings, (e.g., ground rod, structural steel, water pipe, etc.). The following are exemplary couplings of the line tester unit 20 throughout the network operations.

Figure 4:
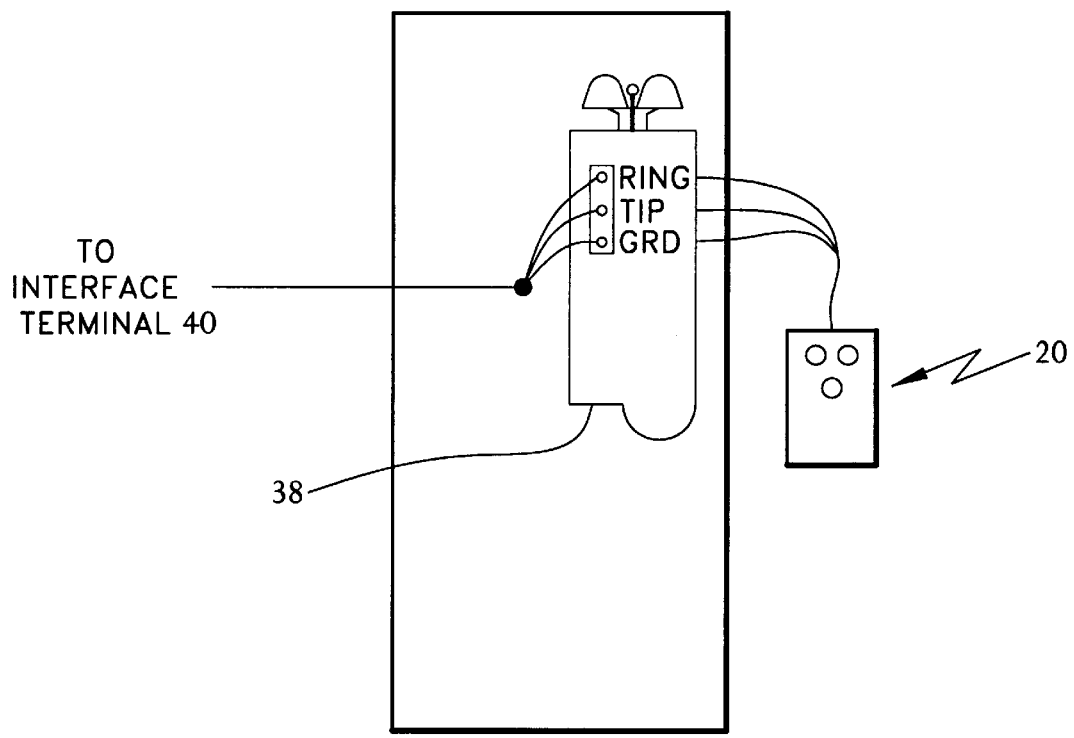
FIG. 4 is a functional diagram showing the line tester being used at the coin-operated telephone site.
Figure 5:
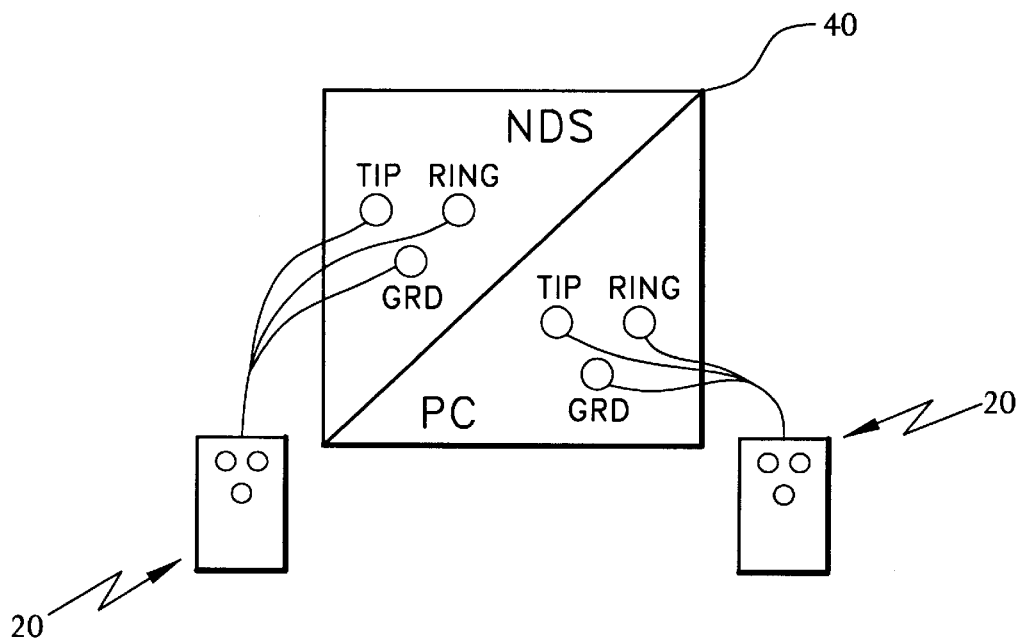
FIG. 5 is a functional diagram showing line testers being used at the interface terminal.
Figure 6:
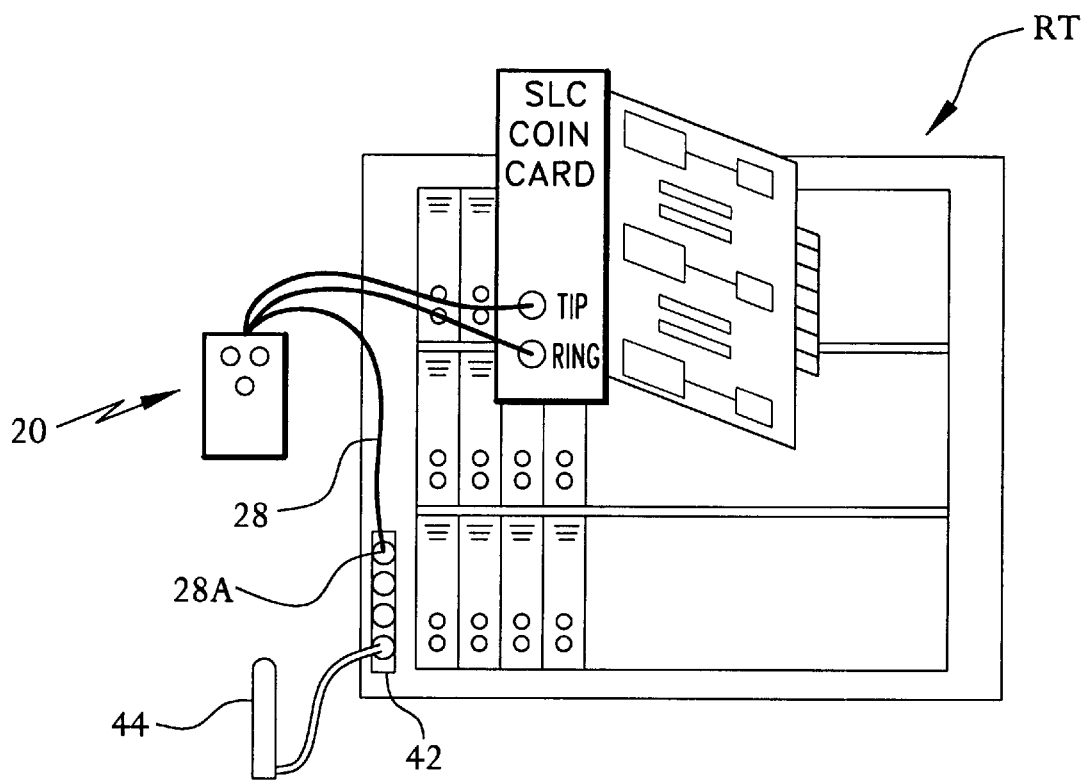
FIG. 6 is a functional diagram showing the line tester being used at the subscriber line carrier card site.

As shown in FIG. 4, the line tester 20 is electrically coupled to the coin-operated telephone chassis 38. FIG. 5 depicts two line tester units 20 used at an interface terminal 40 at the customer site. FIG. 6 depicts the line tester 20 being electrically coupled to the SLC card at the RT site; the GND test lead 28/clip 28A is coupled to a ground bus 42 that is, in turn, electrically coupled to a ground rod 44.

It should be understood that although the present invention is preferably designed for operation on a Bell Telephone system, the line tester 20 is adaptable for use with any coin-operated telephone network utilizing a TIP, RING and GND signal.

Without further elaboration, the foregoing will so fully illustrate my invention that others may, by applying current or future knowledge, readily adopt the same for use under various conditions of service.

I claim:

1. A portable testing unit for testing the interface between a coin-operated telephone and a telephone network connected thereto, the telephone network carrying a TIP electrical signal and a RING electrical signal and having a ground connection (GND) associated therewith at access points throughout the network, said portable testing unit being a passive, electrically operative device simulating the input and output of the coin-operated telephone to ensure proper polarity between the telephone and the telephone network, said portable testing unit including:

a first probe for coupling to said telephone network to sense the TIP electrical signal;

a second probe for coupling to said telephone network to sense the RING electrical signal;

a third probe for coupling to said ground connection;

electronic means coupled to said probes to provide a first output signal when the detected polarity is proper, a second output signal when the detected polarity is improper; and dial tone capture means, ground sensing means, coin return voltage means, signal conditioning means and switching means having a first state and a second state.

2. The portable test unit of claim 1 wherein said signal conditioning means is coupled to said first probe and said switching means is coupled to said second probe and said third probe.

3. The portable test unit of claim 2 wherein said dial tone capture means is coupled to said second probe when said switching means is in said first state.

4. The portable test unit of claim 3 wherein said ground sensing means and said coin return voltage means are coupled to said third probe when said switching means is in said second state.

5. The portable test unit of claim 4 wherein said switching means is manually-operable.

6. The portable testing unit of claim 1 wherein said signal conditioning means comprises a bridge rectifier and a current limiter.

7. The portable testing unit of claim 1 wherein said dial tone capture means includes means for providing a visual output signal representative of sensed TIP-RING polarity.

8. The portable testing unit of claim 1 wherein said coin return voltage means includes means for providing a visual output signal representative of a −130 return voltage pulse being sent by the network.

9. A method for testing the interface between a coin-operated telephone and a telephone network wherein the telephone network carries a TIP electrical signal, a RING electrical signal and has a ground connection (GND) associated therewith at respective terminals at a plurality of access points, and wherein the telephone network includes electronic switching system translation and coin supervisory line equipment, said method comprising the steps of:

coupling the TIP electrical signal terminal to the RING electrical signal terminal through a series combination of a rectifier/current limiter, a pair of oppositely-oriented light-emitting diodes connected in parallel, and an open switch;

closing said switch to electrically couple the TIP electrical signal terminal and the RING electrical signal terminal through said series combination and monitoring which of said pair of oppositely-oriented light emitting diodes illuminates to determine the TIP-RING polarity;

opening said switch and thereby disconnecting the RING electrical signal terminal from the TIP electrical signal terminal and connecting the TIP electrical signal terminal to the around connection (GND), in preparation for a ground test if the TIP-RING polarity is proper;

introducing another light emitting diode in between said TIP electrical signal terminal and the around connection (GND), said light emitting diode illuminating if the proper around path is available and if the telephone network transmits a −130 return voltage, checking for good earth connections if said another light emitting diode fails to illuminate; and checking the electronic switching system translation and coin supervisory line equipment if said another light emitting diode fails to illuminate.

10. The method of claim 9 wherein the telephone network includes a pair-gain system and subscriber line carrier coin cards and wherein said method further comprises the step of checking the subscriber line carrier coin cards.

* * * * *